US008261239B2

(12) United States Patent
McGrath et al.

(10) Patent No.: US 8,261,239 B2
(45) Date of Patent: Sep. 4, 2012

(54) LOCATING A TESTABLE OBJECT IN A FUNCTIONAL TESTING TOOL

(75) Inventors: Frank McGrath, Wellesley, MA (US); Mark Metheny, Shirley, MA (US); Kenneth Sandler, Billerica, MA (US); William C. Tobin, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 10/745,822

(22) Filed: Dec. 23, 2003

(65) Prior Publication Data

US 2004/0194054 A1 Sep. 30, 2004

Related U.S. Application Data

(60) Provisional application No. 60/457,631, filed on Mar. 25, 2003.

(51) Int. Cl.
*G06F 9/44* (2006.01)
*G06F 3/00* (2006.01)
(52) U.S. Cl. ......... 717/125; 717/124; 717/128; 715/704
(58) Field of Classification Search .................. 717/124
See application file for complete search history.

(56) References Cited

U.S. PATENT DOCUMENTS

| 5,452,442 | A * | 9/1995 | Kephart | 714/38 |
| 6,360,332 | B1 * | 3/2002 | Weinberg et al. | 714/4 |
| 6,694,509 | B1 * | 2/2004 | Stoval et al. | 717/124 |
| 6,948,152 | B2 * | 9/2005 | Dubovsky | 717/124 |
| 6,961,873 | B2 * | 11/2005 | Dubovsky | 714/38.13 |
| 6,978,401 | B2 * | 12/2005 | Avvari et al. | 714/38 |
| 6,986,125 | B2 * | 1/2006 | Apuzzo et al. | 717/124 |
| 7,010,782 | B2 * | 3/2006 | Narayan et al. | 717/124 |
| 7,055,137 | B2 * | 5/2006 | Mathews | 717/125 |
| 7,165,074 | B2 * | 1/2007 | Avvari et al. | 707/102 |
| 7,165,240 | B2 * | 1/2007 | Patterson | 717/116 |
| 7,398,469 | B2 * | 7/2008 | Kisamore et al. | 715/704 |
| 7,665,068 | B2 * | 2/2010 | Neumann et al. | 717/125 |
| 7,979,849 | B2 * | 7/2011 | Feldstein et al. | 717/128 |
| 2003/0005413 | A1 * | 1/2003 | Beer et al. | 717/125 |
| 2003/0182469 | A1 * | 9/2003 | Lok et al. | 709/328 |
| 2004/0001077 | A1 * | 1/2004 | Patterson | 345/700 |

OTHER PUBLICATIONS

Mercury Interactive Corporation, WinRunner 7.0 User's Guide, 2000, 1293 pages, <www.wilsonmar.com/docs/wr70/wr_tut.pdf>.*
Ivory et al., The state of the art in automating usability evaluation of user interfaces, Dec. 2001, 47 pages, <http://delivery.acm.org/10.1145/510000/503114/p470-ivory.pdf>.*
Hilbert et al., Extracting usability information from user interface events, Dec. 2000, 38 pages, <http://delivery.acm.org/10.1145/380000/371593/p384-hilbert.pdf>.*

* cited by examiner

*Primary Examiner* — Thuy Dao
(74) *Attorney, Agent, or Firm* — Steven M. Greenberg, Esq.; Carey, Rodriguez, Greenberg & O'Keefe

(57) ABSTRACT

A method, system and apparatus for locating a testable object in a functional testing tool is provided. The method can include comparing object properties for a mapped testable object to object properties for each of a set of candidate testable objects organized in a hierarchy, computing an anchor object in the hierarchy, and determining a best matching candidate testable object for the mapped testable object without requiring an exact match of the object properties while constraining the comparing and determining steps with respect to the anchor object.

7 Claims, 1 Drawing Sheet

LOCATING A TESTABLE OBJECT IN A FUNCTIONAL TESTING TOOL

CROSS-REFERENCE TO RELATED APPLICATIONS

This patent application claims the benefit under 35 U.S.C. §119(e) of presently U.S. Provisional Patent Application No. 60/457,631, entitled LOCATING A TESTABLE OBJECT IN A FUNCTIONAL TESTING TOOL, filed on Mar. 25, 2003, the entire teachings of which are incorporated herein by reference.

BACKGROUND OF THE INVENTION

1. Statement of the Technical Field

The present invention relates to the field of software functional testing and more particularly to locating a testable object in a functional testing tool.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

In operation, the conventional functional testing tool can monitor and record the interaction between end user and GUI during a recording phase of functional testing. In this regard, a testing script can be produced based upon the identity of GUI elements addressed by the end user and the sequence in which the GUI elements are addressed. Within the script, GUI elements, referred to herein as "objects", can be identified by absolute reference to each object. The absolute reference can include any number of element properties which, when combined with one another, can uniquely identify the desired object. Properties can include any explicit object property such as a data or method member, or any metadata associated with the object. Examples can include the class index, the accessible role, the object position, associated text, class name, and child and parent element identity, just to name a few.

Yet, the skilled artisan will recognize the inherent danger in absolutely identifying an object. Specifically, during the course of developing an application, the properties of an object can change as elements are added, modified and deleted from the application. Moreover, ambiguities can arise where the uniqueness of a GUI related object is dissolved as a result of an added, modified or deleted object. Consequently, an absolute reference to an object in the GUI can be rendered invalid and unresolvable in the face of application modifications. Therefore, the script generated to exercise the GUI suddenly can become inoperable.

To address the foregoing deficiencies several popular functional testing tools have augmented the number of properties available to uniquely identify a GUI element. By increasing the number of possible combinations of GUI element properties, it is presumed that uniquely specifying a GUI element merely is a matter of selecting enough properties in combination with one another such that no other GUI element is likely to be confused with the intended GUI element. Nevertheless, requiring the specification of a GUI element with a combination of a multiplicity of properties can exacerbate the problem of identifying a GUI element during the testing phase. That is to say, a mere slight modification to the GUI of an application under test can result in no GUI elements in the GUI satisfying the unique combination of the multiplicity of properties. Significantly, where a desired object cannot be located during the testing phase of an application, an "object not found" exception can arise defeating the operation of the functional testing tool.

SUMMARY OF THE INVENTION

The present invention is a system, method and apparatus for locating a testable object in a functional testing tool. In accordance with the inventive arrangements, mapped objects relied upon by the functional testing tool in executing a testing script can be located in the software application under test through a "fuzzy", inexact matching process. In the fuzzy matching process of the present invention, absolute matches between candidate objects and mapped objects are not required to resolve the location of the mapped object in the GUI of the software application under test. Rather, an imperfect match between candidate objects and mapped objects can be used to resolve the location of the mapped object in the GUI of the software application under test.

Importantly, as objects in an object mapping can be organized in a hierarchical fashion, a desired candidate object need not be located by reference strictly to the root node of the hierarchy. In particular, the entirety of the hierarchy need not be traversed from the root node in order to resolve the identity of the desired candidate object resulting in maximum inefficiencies. Rather, in accordance with the inventive arrangements, a desired object in the hierarchy can be evaluated by reference to an anchor object residing within the hierarchy. To that end, so long as the anchor object can be resolved, fewer evaluations will be required to locate the desired candidate object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
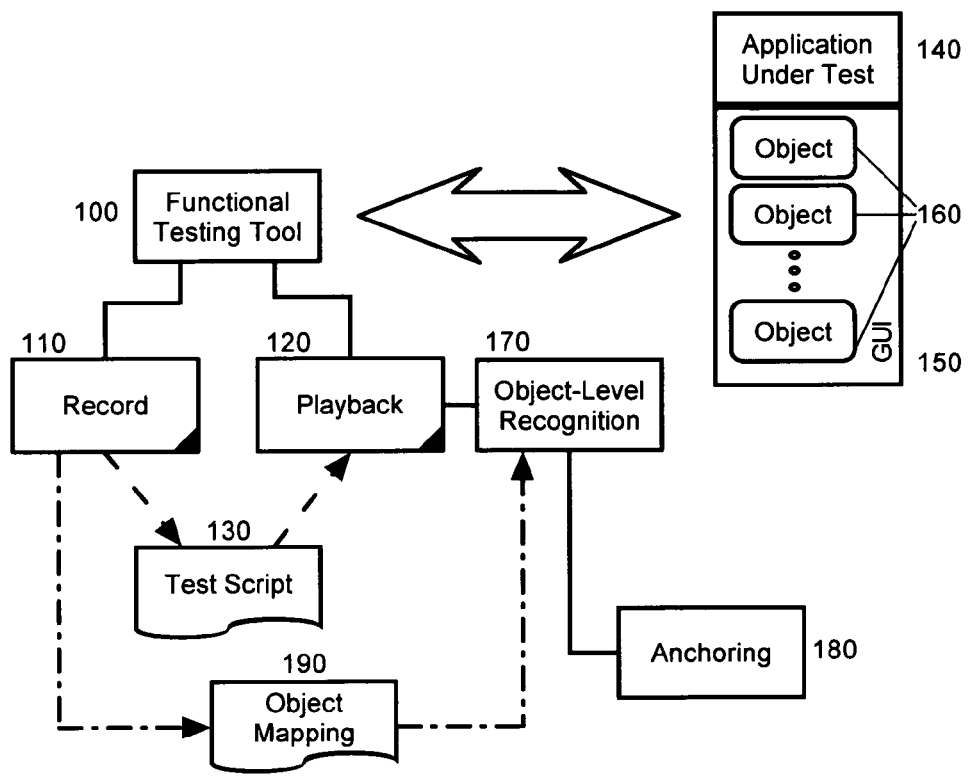
FIG. 1 is a pictorial illustration of a functional testing system which has been configured in accordance with the inventive arrangements.

The present invention is a method, system and apparatus for locating testable objects in a functional testing tool. In accordance with the present invention, object properties for a mapped object can be compared to object properties for each of a set of candidate objects organized in a hierarchy. An anchor candidate object can be computed in the hierarchy. Consequently, a best matching candidate object can be determined for the mapped object without requiring an exact match of the object properties while constraining the comparing and determining steps with respect to the anchor candidate object. Notably, the hierarchy can be a tree structure comprising a root node, a plurality of intermediate nodes, and a plurality of terminal nodes. Also, the anchor candidate object can reside in a path between a root node and a node encapsulating the mapped object.

FIG. 1 is a pictorial illustration of a functional testing system which has been configured in accordance with the inventive arrangements. The system can include a functional testing tool 100 configured to test the functionality of the GUI 150 of an application under test 140. Functional testing tools are well-known in the art and can include by way of example, the testing tool family of products produced by Rational Software of Lexington, Mass., United States of America, now a division of International Business Machines Corporation of Armonk, N.Y., United States of America.

The functional testing tool 100 can test the GUI 150 of the application under test initially through a recording process 110. In the recording process 110, user interactions with objects 160 in the GUI 150 can be captured from which a test script 130 can be produced. The test script 130, in turn can be processed by a playback process 120 to reproduce the interactions of the user with the objects 160 of the GUI 150. Typical interactions include mouse clicks depressing buttons, selecting list items and providing keyboard input to edit boxes, though the skilled artisan will recognize that the foregoing list of typical interactions hardly represents an exclusive listing. In any case, the test script 130 can include several categories of executable statements, including statements directing the emulation of user actions, statements for validating application states, and other miscellaneous statements such as a command for launching an application.

Importantly, an object manager configured to perform object-level recognition 170 can be included in the functional testing tool 100 with which objects 160 within the GUI 150 which are required for use by statements in the test script 130 can be located. More particularly, during the recording process 110, an object mapping 190 can be constructed for each object 160 implicated by the test script 130. The object mapping 190 can include mapped objects which represent one of a direct referring means, or an indirect means of accessing and managing objects 160 in the GUI 150. The mapped objects preferably can include properties and methods that enable the object manager 170 to recognize and manage objects 160 during the playback process 120.

In a preferred aspect of the present invention, a test object can be constructed which can include a reference to a corresponding object 160 in the GUI 150 of the application under test 140. The reference either can point directly to the object, or to a uniquely identified description. Where the reference points to a uniquely defined description, the reference can be included in the object mapping 190. To that end, the reference can include a collection of name/value pairs that describe the properties and expected values of an object 160 in the GUI 150. Thus, the object mapping 190 can be an approximate representation for the hierarchy of objects 160 in the GUI 150.

In operation, when a method is invoked on a test object by way of a statement in the test script 130, the object manager 170 can search the GUI 150 for an object 160 which at least partially matches a description of the invoked test object. Yet, as the playback process 120 and the application under test 140 reside in separate processes, data and control must be transferred between the processes. Notably, when a method is invoked on an object 160 in the GUI 150, an object can be returned as will be understood by the skilled artisan. While certain returned objects can be considered values, other returned objects will not be considered values. Furthermore, while values can be easily passed between processes, non-values, for instance a button in the GUI 150, cannot be passed between processes without fundamentally altering the nature of the non-value object.

In consequence, in one aspect of the present invention, when a method is invoked on an object 160 in the GUI 150 which results in the return of a non-value object, a remote reference to the non-value object can be established within the same type of structure as a test object. Furthermore, a remote object reference can be stored in the test object structure in lieu of storing an object description in the test object structure. The remote object reference itself can be maintained by the functional testing tool 100 until the user "unregisters" the test object storing the remote reference, the playback process 120 terminates, or the functional testing tool 100 itself is terminated.

Importantly, as the test object containing the remote object reference can behave as any other test object in the object mapping 190, methods can be invoked on the test object containing the remote object reference, which in turn can return other test objects. Moreover, as the test object containing the remote object reference can be stored in the object mapping 190, the object manager 170 need not search for the remote object in the GUI 150 as a direct reference remains in the object mapping 190. Thus, greater efficiencies can be enjoyed from the modeling of a remote object reference as a test object in the object mapping 190.

Significantly, it will be recognized by the skilled artisan that the system illustrated in FIG. 1 merely represents the simplistic case of searching the entirety of a GUI of an application under test for a single closest matching object within a single process. In a alternative aspect of the present invention, however, several resource optimizing techniques are to employed to accommodate the practical realities of a multi-threaded, multi-process design. Specifically, the object mapping 190 can include a set of test objects organized into a hierarchy or tree structure.

The hierarchical relationship can be that of parent-child in which a test object having no parent is considered to be the top-level or root node object. The path for a specified test object can be a vector of mapped test objects starting with the top-level object and culminating with the specified test object. To that end, the path can include the parent of the specified test object, the grandparent of the specified test object, and so forth leading up to the top-level test object. Notably, a similar hierarchy can be constructed for the set of proxies for the objects in the GUI of the application under test.

Whereas ordinarily the entire hierarchy must be traversed to locate the specified test object, in accordance with the inventive arrangements the anchoring system 180 of FIG. 1 can be included to simplify the location of a specified test object. In particular, the specified test object can be resolved by reference to another test object in the hierarchy. Referred to as an "anchor" the referenced test object can constrain the search for the specified test object. As an example, considering the method call T1(T2( )).m( ), T1( ) and T2( ) can be methods which return test objects and which also reside in the same object path, while m( ) can be a method invoked on the test object returned from T1( ). The test object returned by the invocation of T2( ) can be referred to as the anchor to T1( ).

If the test object returned by T2( ) is an ancestor of T1( ), then the search for T1( ) can be constrained by the test object returned by T2( ) and efficiencies can be gained as a result. Similarly, where T2( ) is a descendant of T1( ), a better opportunity for recognition can arise and efficiencies also can result. In both cases, ambiguities can be resolved through the use of the anchoring system 180B of FIG. 1. Importantly, where T1( ) returns a test object having a remote object reference, even greater efficiencies can be gained as there will be no need to conduct a search for T1( ).

Importantly, a test object containing an anchor must not itself contain a remote object reference as no search is performed in that circumstance. Yet, a test object relied upon as an anchor can contain either a description of a testable object, or a remote object reference. Finally, it is to be noted that a test object, in addition to containing a description of a testable object or a remote, also can contain a reference to an operating system process. In this regard, the use of a test object as an anchor which refers to an operating system process, can constrain a search for a test object to those found within the referred process.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for locating testable objects in a functional testing tool, the method comprising the steps of:
   comparing object properties for a mapped testable object comprising a graphical user interface (GUI) object rendered in a GUI provided by a display of a computer that is testable, to object properties for each of a set of candidate testable objects organized in a hierarchy;
   computing in the computer an anchor object in the hierarchy; and,
   determining a best matching candidate testable object for the mapped testable object without requiring an exact match of the object properties while constraining the comparing and determining steps with respect to the anchor object.

2. The method of claim 1, wherein the hierarchy is a tree structure comprising a root node, a plurality of intermediate nodes, and a plurality of terminal nodes.

3. The method of claim 1, wherein the anchor candidate object resides in a path between a root node and a node encapsulating the mapped object.

4. A machine readable storage having stored thereon a computer program for locating testable objects in a functional testing tool, the computer program comprising a routine set of instructions which when executed by the machine cause the machine to perform the steps of:
   comparing object properties for a mapped testable object comprising a graphical user interface (GUI) object rendered in a GUI that is testable, to object properties for each of a set of candidate testable objects organized in a hierarchy;
   computing an anchor object in the hierarchy; and,
   determining a best matching candidate testable object for the mapped testable object without requiring an exact match of the object properties while constraining the comparing and determining steps with respect to the anchor object.

5. The machine readable storage of claim 4, wherein the hierarchy is a tree structure comprising a root node, a plurality of intermediate nodes, and a plurality of terminal nodes.

6. The machine readable storage of claim 4, wherein the anchor candidate object resides in a path between a root node and a node encapsulating the mapped object.

7. A method for locating testable objects in a functional testing tool, the method comprising the steps of:
   comparing object properties for a button in a GUI provided by a display of a computer, to object properties for each of a set of candidate testable objects organized in a hierarchy;
   computing in the computer an anchor object in the hierarchy; and,
   determining a best matching candidate testable object for the button without requiring an exact match of the object properties while constraining the comparing and determining steps with respect to the anchor object.

* * * * *